United States Patent [19]
Sleight et al.

[11] Patent Number: 5,514,360
[45] Date of Patent: May 7, 1996

[54] NEGATIVE THERMAL EXPANSION MATERIALS

[75] Inventors: Arthur W. Sleight, Philomath; Mary A. Thundathil; John S. O. Evans, both of Corvallis, all of Oreg.

[73] Assignee: The State of Oregon Acting by and Through the Oregon State Board of Higher Education on Behalf of Oregon State University, Corvallis, Oreg.

[21] Appl. No.: 397,695

[22] Filed: Mar. 1, 1995

[51] Int. Cl.$^6$ .......................... C01G 25/02; C01G 27/02
[52] U.S. Cl. .................................................. 423/593
[58] Field of Search ............................... 423/593

[56] References Cited

U.S. PATENT DOCUMENTS

| | | | |
|---|---|---|---|
| 1,399,705 | 12/1921 | Ekeley et al. | 423/593 |
| 4,269,898 | 5/1981 | Boonstr et al. | 423/593 |
| 5,322,559 | 6/1994 | Sleight . | |

OTHER PUBLICATIONS

"Linear Thermal Expansion of Three Tungstates," *J. Am. Ceram. Soc.–Discussions and Notes*, 51:227–228 (1968), Martinek, et al.

"A New Ternary Oxide, ZrW$_2$O$_8$," *J. Am. Ceram. Soc. Discussions and Notes*, 42:570 (1959), Graham, et al.

"Condensed Phase Relations in the Systems ZrO$_2$–WO$_2$–WO$_3$ and HfO$_2$–WO$_2$–WO$_3$," *J. Am. Ceram. Soc.*, 50:211–215 (1967), Chang, et al.

"Subsolidus Equilibria in the System ZrO$_2$–WO$_3$–P$_2$O$_5$," *J. Am. Ceram. Soc.*, 53:159–161 (1970), Martinek, et al.

"X–Ray Diffraction Investigation of the Compounds AB$_2$O$_8$," *Russian Journal of Inorganic Chemistry*, vol. 12, No. 11, (Nov. 1967), Trunov, et al.

*Primary Examiner*—Wayne Langel
*Attorney, Agent, or Firm*—Klarquist Sparkman Campbell Leigh & Whinston

[57] ABSTRACT

A method for making tungstate compounds according to the formula XW$_2$O$_8$, wherein X is selected from the group consisting of zirconium, hafnium, and combinations thereof, is described. Also described are compositions that include the tungstate compounds, and a method for reducing the positive thermal expansion of a material using such tungstate compounds. Substantially single phase compounds can be made by practicing the method, which method also reduces the synthesis time relative to known methods, and expands the reactants that can be used for the synthesis over the methods reported previously. The tungstate compounds generally can be made by forming a solution, particularly an aqueous solution, comprising a W$^{6+}$ compound and a second metal compound wherein the metal is selected from the group consisting of Zr$^{4+}$, Hf$^{4+}$ and combinations thereof. The solvent is removed from the solution by any known method to leave the solutes as a solid product. The solid product is then heated to a temperature of greater than about 600° C., preferably at least about 1165° C., more preferably from about 1165° C. to about 1250° C., and even more preferably to about 1200° C. The heated product is then cooled to ambient temperature, generally relatively rapidly, to produce substantially single phase tungstate compounds.

23 Claims, 4 Drawing Sheets

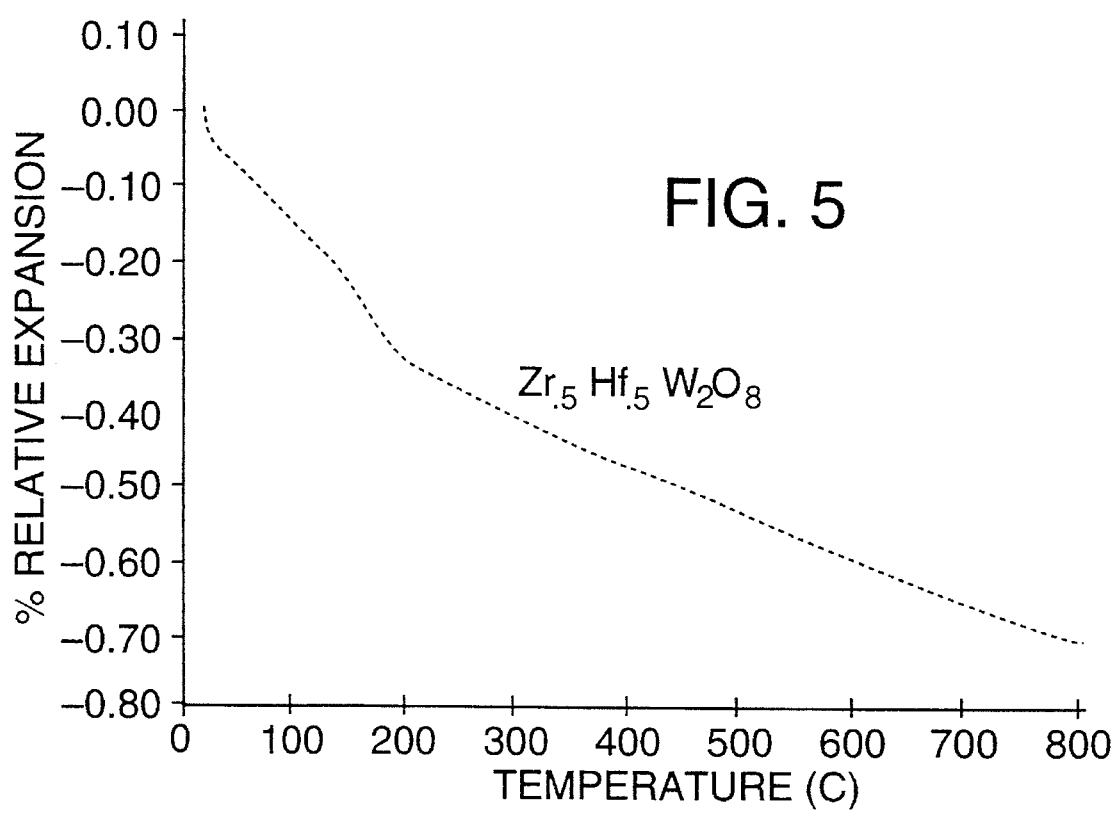

NEGATIVE THERMAL EXPANSION MATERIALS

FIELD OF THE INVENTION

This invention concerns negative thermal expansion materials, particularly zirconium and hafnium tungstates.

BACKGROUND OF THE INVENTION

Most materials expand upon heating, with the expansion being generally unequal in each dimension. There are only a few compounds that are known to exhibit isotropic negative thermal expansion, i.e., the compounds contract equally (isotropically) in all directions upon heating. Examples of known compounds that exhibit isotropic negative thermal expansion are described in U.S. Pat. No. 5,322,559, which is incorporated herein by reference.

Zirconium tungstate ($ZrW_2O_8$) and hafnium tungstate ($HfW_2O_8$) are known compounds. It also is known that the expansion coefficients for zirconium tungstate are negative. Martinek, et al.'s *Linear Thermal Expansion of Three Tungstates, J. Am. Ceram. Soc. Discussions and Notes*, 51:227–228 (1968). The benefits deriving from the thermal expansion characteristics of these tungstate compounds have gone unrecognized. Moreover, as discussed in more detail below, known procedures for making zirconium tungstate are less than optimal.

There are five known literature reports for the synthesis of zirconium tungstate. Each of these procedures used zirconium(IV)oxide ($ZrO_2$) and tungsten(VI)oxide ($WO_3$) as the reactants. The synthetic procedures involve first comminuting the reactants (reducing the reactants to small particles) and then heating them together to a temperature of about 1200° C. The step of heating is then followed by rapid cooling to prevent zirconium tungstate from decomposing into zirconium oxide and tungsten oxide.

Graham originally stated that the reaction of zirconium oxide with tungsten oxide to form zirconium tungstate was complete within about 15 minutes at 1200° C. The authors later recanted the success of the synthetic procedure, and stated that they were never able to prepare zirconium tungstate that was free of zirconium oxide and tungsten oxide. Graham et al.'s *A New Ternary Oxide, $ZrW_2O_8$, J. Am. Ceram. Soc., Discussions and Notes*, 42:570–571 (1959). This difficulty is apparently related to (1) the volatility of tungsten oxide at 1200° C., and (2) the reactivity, or lack thereof, of zirconium oxide under the synthetic conditions used by Graham.

Martinek and Hummel also described the synthesis of certain tungstate compounds, including zirconium tungstate. Martinek et al.'s, *Linear Thermal Expansion of Three Tungstates*, supra. The synthesis involved reacting zirconium oxide with "tungstic acid," which is either $H_2WO_4$ or $WO_3$. It is unclear from Martinek's disclosure which of these compounds was used. The reactants were combined and then heated to a temperature of about 1150° C., which was maintained for four hours, followed by rapid cooling. There is no indication in this paper concerning the purity of the compound that was obtained by the synthetic procedure described.

Chang also described a method for preparing zirconium and hafnium tungstate. Chang et al.'s *Condensed Phase Relations in the Systems $ZrO_2$—$WO_2$—$WO_3$ and $HfO_2$—$WO_2$—$WO_3$, J. Am. Ceram. Soc.*, 50:211–215 (1967). Chang placed the respective reactants in sealed platinum tubes, primarily because of the volatility of $WO_3$ at elevated temperatures. Chang specifically states that "equilibrium experiments indicate that this compound [zirconium tungstate] can only be obtained as a single phase from $ZrO_2$ and $WO_3$ in the proper stoichiometric ratio through prolonged heating, i.e., at least 24 hr. at 1200° C." Chang et al., supra, at page 212. Martinek later refuted this statement. Martinek specifically stated that the "present work only confirmed the limited stability of $ZrW_2O_8$. The compound cannot be formed below 1105° C., and even at 1200° C. 48 h were required to produce $ZrW_2O_8$ free of $ZrO_2$ and $WO_3$." Martinek et al.'s *Subsolidus Equilibria in the System $ZrO_2$—$WO_3$—$P_2O_5$, J. Am. Ceram. Soc.*, 53:159–161 (1970).

In summary, there are significant drawbacks associated with known synthetic methods for making zirconium and hafnium tungstates. For instance, the only reactants used in procedures to synthesize zirconium or hafnium tungstate are zirconium(IV)oxide, hafnium(IV)oxide and tungsten-(VI)oxide. This substantially limits the synthetic approaches to forming tungstates. Furthermore, it appears that the known methods produce compounds that are contaminated with other materials, even after prolonged, and therefore commercially expensive, heating periods.

SUMMARY OF THE INVENTION

The present invention provides a novel method for making tungstate compounds according to the formula $XW_2O_8$, wherein X is selected from the group consisting of zirconium, hafnium and combinations thereof. The method generally allows the manufacture of substantially single-phase compounds, i.e., the compounds are substantially pure. The method significantly reduces the synthesis time to ten percent or less of the forty-eight hours reported by Martinek as being required for the manufacture of $ZrW_2O_8$ free of $ZrO_2$ and $WO_3$. *Subsolidus Equilibria in the System $ZrO_2$—$WO_3$—$P_2O_5$*, supra. The present method also greatly expands the reactants that can be used for the synthesis of such tungstates.

One embodiment of the invention provides a method for making tungstate compounds involving the formation of certain solutions containing reactive species. A currently preferred solvent for forming such solutions is water. However, solvents other than water, whether now known or hereafter discovered, which (1) dissolve the reactants and (2) can be readily separated from the solutes dissolved therein, such as by evaporation, may be used to practice the invention. This would include polar organic solvents, such as alcohols (Example 7), and inorganic solvents such as hydrogen peroxide and aqueous ammonium hydroxide. Solely for purposes of illustration and without limitation, the method of the invention will be described generally with reference to water as the solvent.

The method of the invention involves forming an aqueous composition comprising a water-soluble metal species, wherein the metal is selected from the group consisting of $Zr^{4+}$, $Hf^{4+}$ and combinations thereof, and a water-soluble $W^{6+}$ species. As used herein, "water soluble" means that the compound referred to is at least partially soluble in water at neutral pH, or is at least partially soluble in water at certain pH values other than a neutral pH, or is at least partially soluble in an aqueous composition that includes an agent that enhances the solubility of the compound in question. In general, both the zirconium and hafnium species are readily soluble in water at virtually all pH values. The tungsten compounds, such as $H_2WO_4$, generally are less water soluble than the hafnium and zirconium species. $H_2WO_4$ is more soluble in aqueous compositions having a relatively high pH, such as a pH of greater than about thirteen. Alternatively, $H_2WO_4$ can be dissolved in certain aqueous compositions, including aqueous hydrogen peroxide and aqueous hydroxide compositions, such as ammonium hydroxide. Once an aqueous composition is formed the water is then removed (i.e., the mixture is dehydrated) by any known method, such as rotary evaporation or heating, to leave the solutes dissolved therein as a solid product.

The solid product is heated in a subsequent step. This heating step comprises heating the solid product to a temperature sufficient to cause the reaction to proceed. Tungstate compounds can be formed using the present method at temperatures of only as high as about 600° C. (see Example 5 below) despite comments in the literature to the contrary. However, the production of single-phase compounds generally has required heating temperatures to be at least as high as about 1165° C. Thus, temperatures suitable for practicing the invention generally are greater than about 600° C., and typically are from about 600° C. to 1250° C. For the preparation of substantially single-phase compounds, the temperature should be at least as high as about 1165° C., typically should be from about 1165° C. to about 1250° C., and preferably should be about 1200° C.

These temperatures typically are maintained for a period of time that is less than about four hours. The heated product is then cooled, generally relatively rapidly, such as by removing the product from a heated oven directly to an environment at room temperature. The cooled product is comminuted to produce a comminuted solid product. The comminuted solid product is then heated a second time to a temperature of from about 600° C. to about 1250° C., again with the preferred temperature being about 1200° C. This heating period also generally is less than about four hours, and it currently is believed that the heating time may be less than about two hours.

There are potentially many examples of water-soluble metal species useful for forming the aqueous composition. The present invention can be practiced with any such water species now known or hereafter discovered. However, solely by way of example and without limitation, examples of suitable zirconium and hafnium water-soluble metal species include zirconium oxyhalides, zirconium oxynitrates, hafnium oxyhalides and hafnium oxynitrates. The oxyhalides and oxynitrates generally are purchased as hydrates. The metal oxyhalides are a currently preferred source of zirconium(IV) and hafnium(IV).

There also are many potential examples of water-soluble $W^{6+}$ species useful for forming the aqueous composition. The present invention can be practiced with any such water-soluble species now known or hereafter discovered. However, solely by way of example and without limitation, a $W^{6+}$ water-soluble species useful for practicing the invention comprises $H_2WO_4$, which is referred to herein as tungstic acid.

Another embodiment of the invention comprises a method for making single-phase compounds according to the formula $XW_2O_8$, wherein X is a metal selected from the group consisting of $Zr^{4+}$, $Hf^{4+}$ and combinations thereof. The method involves forming a first aqueous composition comprising a compound selected from the group consisting of zirconium oxyhalides, zirconium oxynitrates, hafnium oxyhalides and hafnium oxynitrates. A second aqueous composition is formed comprising a water-soluble $W^{6+}$ species. An aqueous mixture is then formed by combining the first and second aqueous compositions. The aqueous mixture is dehydrated by any suitable means to produce a solid product. The solid product is heated for a period of time and to a temperature sufficient to form a single-phase compound according to the formula $XW_2O_8$. The method also can involve the additional steps of cooling the solid product, comminuting the cooled solid product, and then heating the solid product for a second period of time.

The present invention also concerns negative thermal expansion compositions comprising tungstate compounds according to the formula $XW_2O_8$. The composition may, but need not, comprise a solid solution of $ZrW_2O_8$ and $HfW_2O_8$. The compounds used to form the negative thermal expansion compositions preferably are manufactured according to the method described above.

The present invention also provides a method for reducing the positive thermal expansion of a material. The method comprises providing a first tungstate material according to the formula $XW_2O_8$. A second material is then provided that exhibits positive thermal expansion. An effective amount of the first material is then added to the second material to form a composition. As used herein, an "effective amount" is any amount which decreases the positive thermal expansion of the material exhibiting positive thermal expansion.

An advantage of the present invention is that the method provides substantially single phase compounds.

Another advantage of the present invention is that the described solution chemistry, in combination with the method steps, apparently provides better reactant dispersion than the grinding techniques taught by known methods.

Another advantage is that the reaction time required to prepare zirconium and hafnium tungstates is significantly reduced relative to known methods.

Another advantage is that the method increases the number of reactants that can be used to form zirconium and hafnium tungstates relative to known methods.

Another advantage of the present invention is that $ZrW_2O_8$ and $HfW_2O_8$ can be used to form compositions containing positive expansion materials wherein the composition has a reduced positive expansion relative to the positive expansion material.

BRIEF DESCRIPTION OF THE DRAWINGS

FIG. 5 is a curve illustrating the relative expansion for a solid solution comprising $ZrW_2O_8$ and $HfW_2O_8$ over temperature.

DETAILED DESCRIPTION OF THE PREFERRED EMBODIMENTS

Figure 1:
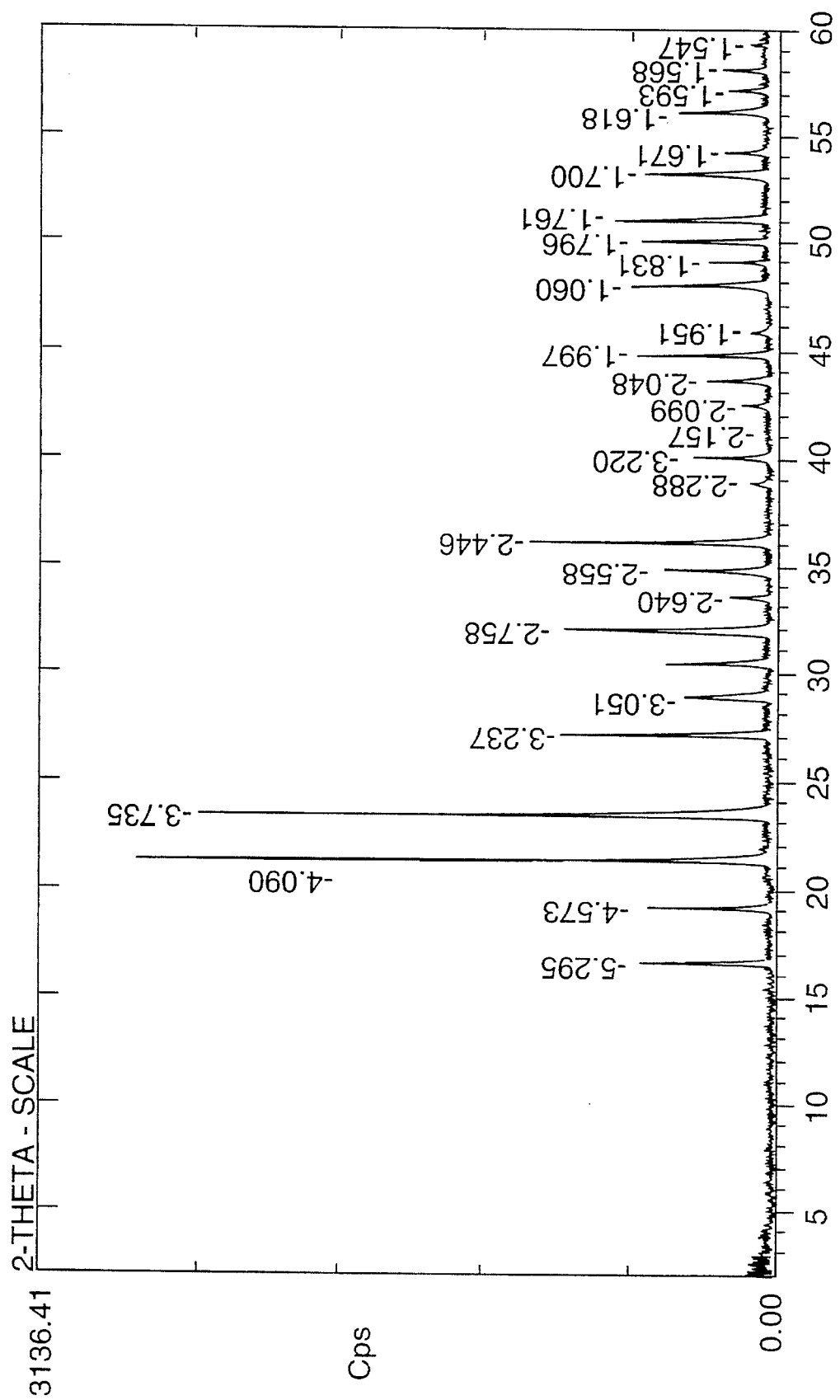
FIG. 1 is an X-ray diffraction pattern showing substantially single phase $ZrW_2O_8$.

The present invention provides a new method for making zirconium tungstates and hafnium tungstates. Compositions also are described which include these tungstates. The compositions reduce the positive thermal expansion characteristic of a material that exhibits positive thermal expansion.

The following discussion describes how to make and use zirconium and hafnium tungstates, as well as compositions that include these tungstates.

I. Synthesis of Tungstates

In general, zirconium and hafnium tungstates can be prepared by first forming a solution comprising a first soluble metal compound and a second soluble metal compound. The metal of the first soluble compound is selected from the group consisting of $Zr^{4+}$, $Hf^{4+}$ and combinations thereof. The second soluble compound comprises a $W^{6+}$ species. The solvent of the solution is then removed to leave the solutes dissolved therein as a solid product. The solid product is then heated to a temperature sufficient to produce zirconium and hafnium tungstates, preferably single phase zirconium and hafnium tungstates.

With reference to aqueous processing, virtually any water-soluble zirconium(IV) and hafnium(IV) compound, whether now known or hereafter discovered, can be used to practice the invention. There are many examples of such compounds, and an exhaustive list thereof will not be attempted. A more complete discussion of water-soluble hafnium and zirconium species can be found in various publications, including Cotton and Wilkinson's *Advanced Inorganic Chemistry A Comprehensive Text* (1983), which is incorporated herein by reference.

Because there are a large number of water-soluble zirconium and hafnium species that can be used to practice the invention, the selection of such compounds will best be decided by considering certain functional criteria regarding the reactants themselves and/or the conditions used to form the zirconium and hafnium tungstates. Such criteria would include, inter alia and without limitation, the (1) availability of the reactants, (2) toxicity of the reactants, (3) volatility of the reactants, (4) water solubility of the reactants, and (5) expense of each reactant. A consideration of these criteria for a particular application may lead to the selection of different sources of water-soluble zirconium and hafnium compounds than those discussed herein.

However, solely by way of example and without limitation, classes of zirconium and hafnium water-soluble species that are useful for practicing the invention include the oxyhalides, oxynitrates and combinations thereof. More specifically, zirconium(IV) and hafnium(IV) compounds useful for practicing the present invention can be selected from the group consisting of $ZrOCl_2$, $ZrOBr_2$, $ZrOI_2$, $HfOCl_2$, $HfOBr_2$, $HfOI_2$, $ZrO(NO_3)_2$, $HrO(NO_3)_2$ and combinations thereof.

A soluble $W^{6+}$ species also is required to practice the invention. Again, there potentially are many examples of suitable tungsten(VI) species that can be used to practice the method. As with the selection of zirconium and hafnium species, selecting a suitable tungsten(VI) species can best be decided by considering the criteria listed above. However, without limitation, one example of a suitable $W^{6+}$ species is tungstic acid ($H_2WO_4$).

Once sources of zirconium(IV), hafnium(IV) and tungsten(VI) have been selected according to the guidelines provided above, a solution, such as an aqueous solution, is then formed containing appropriate amounts of each of these reactants. The solution can be formed by adding each of the particular species to a desired amount of solvent. Alternatively, a currently preferred method comprises first forming two separate solutions. The first solution includes the zirconium(IV) or hafnium(IV) species. The second solution includes the W(VI) species. These two solutions are then combined to form a new composition.

The concentration of the metal species in any of the solutions is not critical. Laboratory-scale preparations have been successfully completed with hafnium(IV) and zirconium(IV) sources, such as the oxyhalides, having molar concentrations of at least about 1 molar, but typically less than about 0.5 molar, and even more typically on the order of about 0.2 to about 0.35 molar. However, these concentrations are provided solely by way of example. The concentration of reactants used for commercial-scale preparations will be as high as possible. As a result, commercial-scale concentrations likely will be greater than the concentrations stated herein. It should be understood that any reactant concentration that produces the compounds described herein can be used to practice the invention.

The relative stoichiometric amounts of the zirconium(IV) and hafnium(IV) species to the W(VI) species are more important than the absolute concentration of each reactant in solution. The relative stoichiometric amounts do not appear to be critical to the formation of product, but may be important in determining the purity of the final product. It currently is believed that the reaction works best and tends to produce single phase tungstate compounds if the relative stoichiometry of the zirconium(IV) and hafnium(IV) species to the W(VI) species is about 1:2.

The method for forming the zirconium and hafnium tungstates will be illustrated by the following examples. These examples should, in no way, be construed to limit the scope of the present invention to the particular aspects discussed therein.

EXAMPLE 1

1.074 grams of $ZrOCl_2 \cdot 8H_2O$ were dissolved in about 10 ml of water. 1.666 grams of $H_2WO_4$ were separately dissolved in aqueous ammonium hydroxide. The solution $Zr^{4+}$ was added to the solution containing $W^{6+}$. The resulting aqueous composition was heated on a hot plate until the liquid phase completely disappeared, thereby producing a solid product. The solid product was then heated at 800° C. for fifteen hours. The product at this stage was observed by X-ray diffraction to be a mixture of $WO_3$ and $ZrO_2$. This product was heated again at 1200° C. for five hours. The product was cooled quickly by removal from the hot furnace directly to ambient conditions. The product was found by X-ray diffraction (FIG. 1) to be single phase $ZrW_2O_8$.

EXAMPLE 2

3.331 grams of $H_2WO_4$ were dissolved in 80 ml of 30% $H_2O_2$. This solution was heated to boiling and the pH was adjusted until it was weakly acidic using aqueous $NH_4OH$. 2.148 grams of $ZrOCl_2 \cdot 8H_2O$ were dissolved in about 30 ml of water. The solution containing $Zr^{4+}$ was then added to the hot solution containing $W^{6+}$. The resulting aqueous composition was heated on a hot plate until the liquid phase had disappeared. This product was ground and heated at 600° C. for two hours. The product was then heated at about 1200° C, for two hours, ground again and heated at 1200° C. for two hours, followed by rapid cooling to room temperature. The X-ray diffraction pattern showed single phase $ZrW_2O_8$.

EXAMPLE 3

Figure 2:
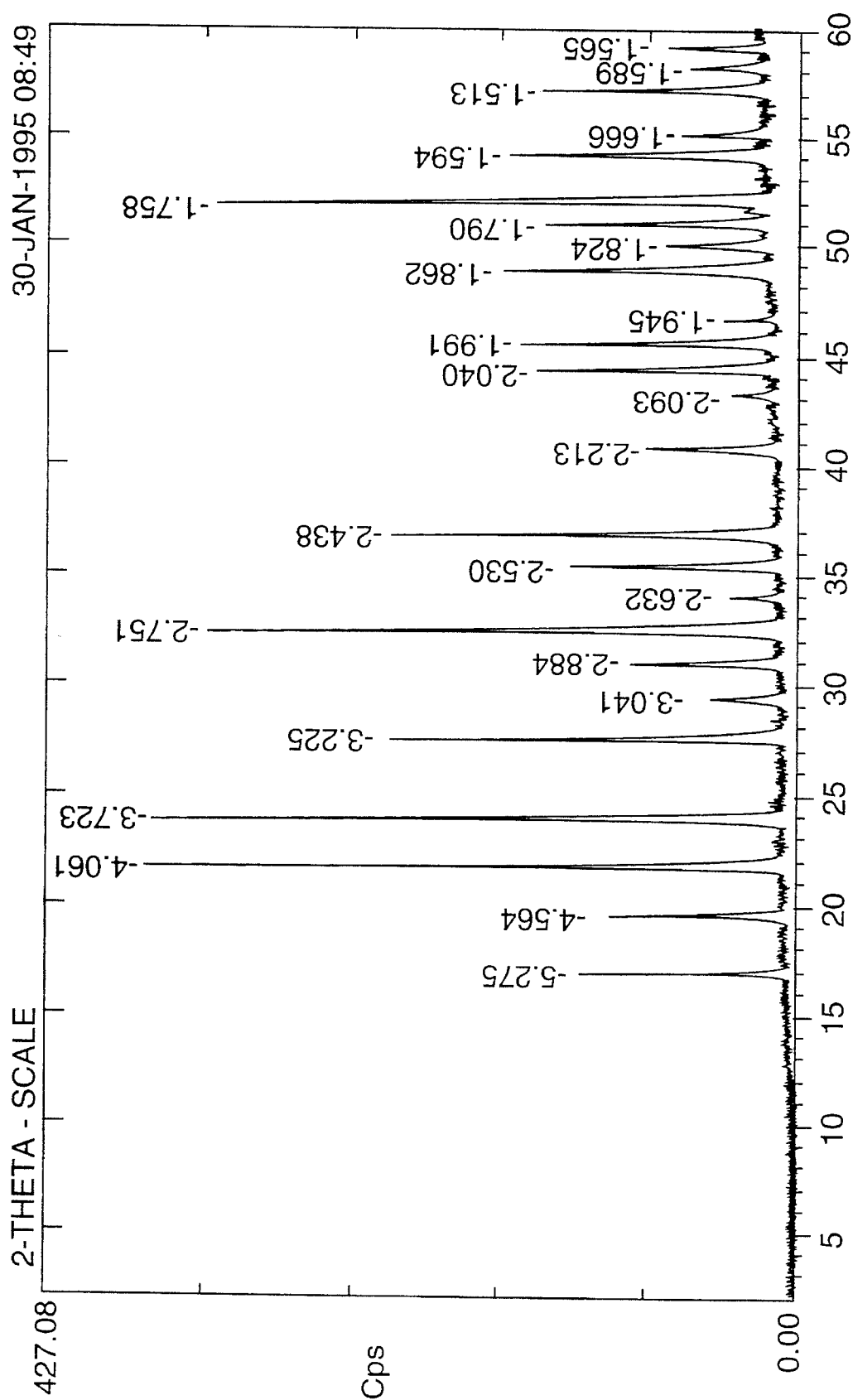
FIG. 2 is an X-ray diffraction pattern showing substantially single phase $HfW_2O_8$.

2.048 grams of $HfOCl_2 \cdot 8H_2O$ were dissolved in about 25 ml of water. 2.499 grams of $H_2WO_4$ were dissolved in 70 ml of boiling thirty percent $H_2O_2$. The solution containing $Hf^{4+}$ was added to the hot solution containing $W^{6+}$. This aqueous composition was heated on a hot plate until the liquid phase completely disappeared, thereby producing a solid product. The solid product was ground and heated at 1200° C. for two hours, and thereafter quickly cooled to room temperature. This product was ground again, heated to 1200° C. for two hours and rapidly cooled to room temperature. The product was found by X-ray diffraction to be single phase $HfW_2O_8$ (FIG. 2).

EXAMPLE 4

2.048 grams of $HfOCl_2 \cdot 8H_2O$ were dissolved in about 25 ml of water. 2.499 grams of $H_2WO_4$ were dissolved in a hot concentrated solution of ammonium hydroxide. The solution containing $Hf^{4+}$ was added to the solution containing $W^{6+}$. This aqueous composition was heated on a hot plate until complete disappearance of the liquid phase. The remaining solid product was ground and heated at 1190° C. for two hours, and then rapidly cooled to room temperature. This product was reground and heated again at 1200° C. for one hour and cooled rapidly to room temperature. X-ray diffraction showed single phase $HfW_2O_8$.

EXAMPLE 5

2.148 grams of $ZrOCl_2 \cdot 8H_2O$ were dissolved in water, and 3.331 grams of $H_2WO_4$ were separately dissolved in concentrated aqueous ammonium hydroxide. This solution was then acidified with concentrated aqueous hydrochloric acid to a pH of about 5. The solution containing $Zr^{4+}$ was added to the solution containing $W^{6+}$. This product was heated on a hot plate until complete disappearance of the liquid. The solid remaining was ground and heated at 400° C. for one hour and then at 600° C. for two hours. X-ray diffraction showed the presence of both crystalline $ZrW_2O_8$ and $WO_3$.

EXAMPLE 6

1.074 grams of $ZrOCl_2 \cdot 8H_2O$ were dissolved in about 15 ml of water. 1.666 grams of $H_2WO_4$ were separately dissolved in about 30 ml of aqueous $NH_4OH$. The $H_2WO_4$ solution was then brought to boiling and its pH was adjusted to be a pH value of about 5 by the addition of aqueous hydrochloric acid. The $Zr^{4+}$ containing solution was added to the hot solution containing $W^{6+}$. This aqueous composition was heated on a hot plate until complete disappearance of the liquid. The solid product was ground and heated at 600° C. for two hours. This product was cooled, reground, and heated at 1200° C. for one hour, followed by rapid cooling to room temperature. An X-ray diffraction pattern showed single phase $ZrW_2O_8$.

EXAMPLE 7

This example illustrates the use of $WCl_6$ and organic solvents for producing tungstate compounds. 7.93 grams of $WCl_6$ were dissolved in 50 ml of ethanol. 2.33 grams of $ZrCl_4$ were dissolved in 50 ml of ethanol and poured into the tungstate solution. No precipitate formed. The solution was heated on a hot plate until the alcohol evaporated. The residue was ground and heated in a platinum crucible at 1200° C. for 2 hours. The product was then quenched, reground, and heated again at 1200° C. for 2 hours, and thereafter quenched to room temperature. X-ray diffraction showed single phase $ZrW_2O_8$.

EXAMPLE 8

This example illustrates the formation of a composition containing zirconium and hafnium tungstates. 4.997 grams of $H_2WO_6$ were dissolved in 10 ml of boiling concentrated $NH_4OH$. 1.61 grams of $ZrOCl_2 \cdot 8H_2O + 2.048$ grams of $HfOCl_2 \cdot 8H_2O$ were dissolved in 20 ml of water, heated and poured into the tungstate solution. The precipitate was dehydrated by heating on a hot plate. The residue was heated in a platinum crucible at 1190° C. for 2 hours, quenched and reground. This product was then heated at 1200° C. for 3 hours with one intermediate quenching and grinding. The product was then quenched to room temperature. X-ray diffraction showed a single phase product having the $ZrW_2O_8$ structure.

II. Negative Thermal Expansion Compositions

Figure 3:
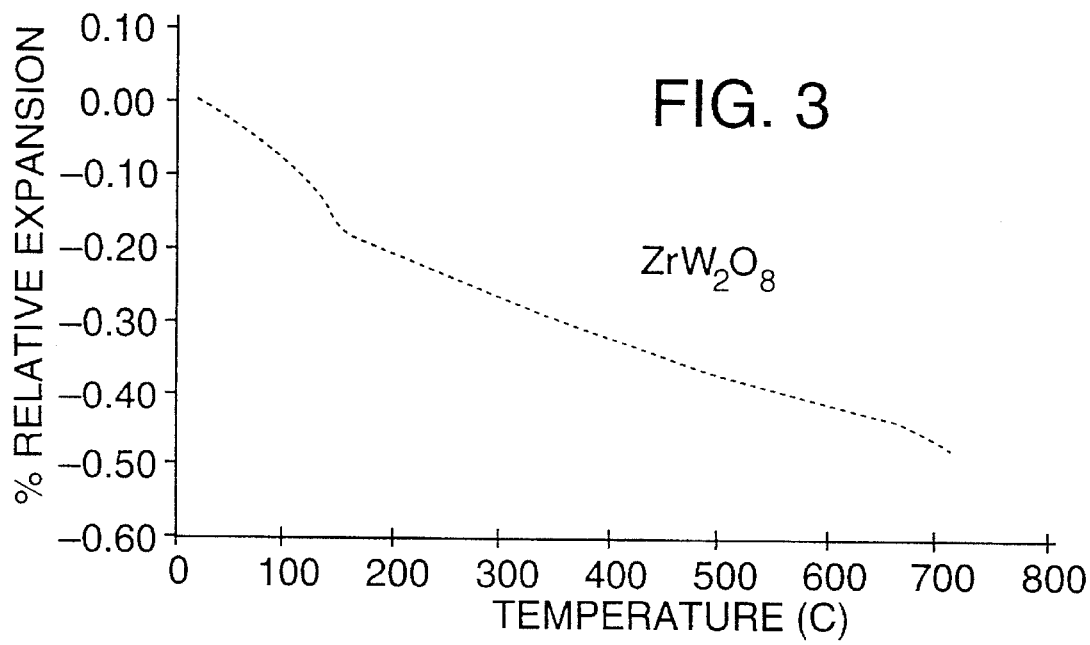
FIG. 3 is a curve illustrating the relative expansion of $ZrW_2O_8$ over temperature.
Figure 4:
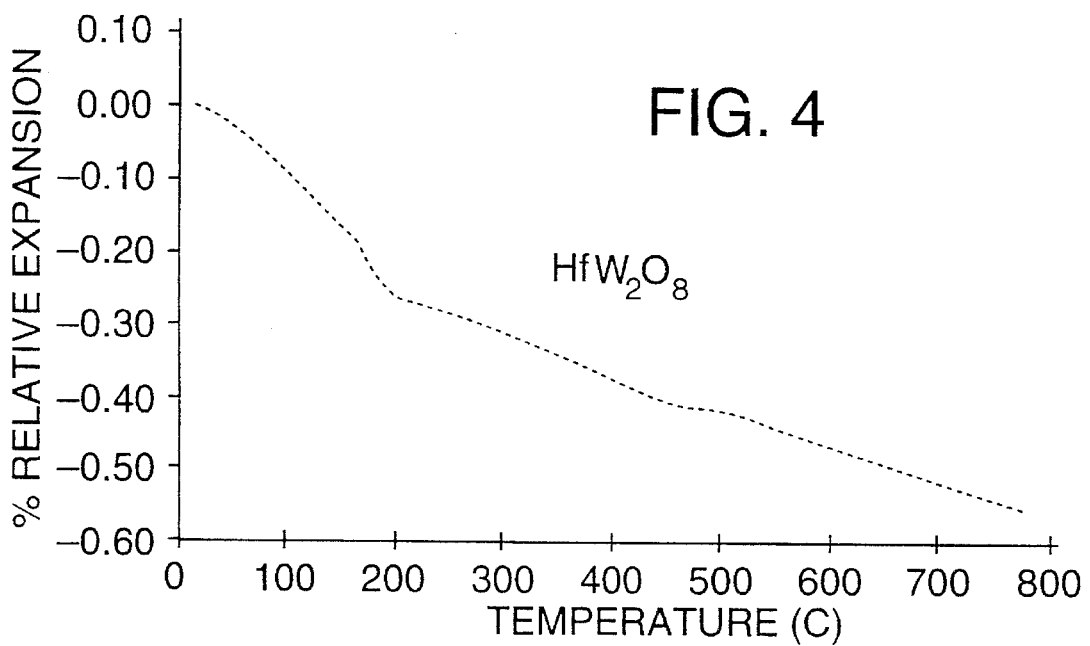
FIG. 4 is a curve illustrating the relative expansion of $HfW_2O_8$ over temperature.

The zirconium and hafnium tungstates of the present invention exhibit negative thermal expansion, as does a solid solution of zirconium and hafnium tungstate. FIGS. 3–5 illustrate the relative expansions of the zirconium and hafnium tungstates, and a solid solution of zirconium and hafnium tungstate, respectively. More specifically, FIG. 3 is a curve illustrating the relative expansion of $ZrW_2O_8$ over temperature. This curve shows that zirconium tungstate exhibits negative relative expansion at all temperatures tested (25° C.– 800° C.). It is particularly important to note that the negative expansion characteristics are observed at or about room temperature. FIG. 4 shows that hafnium tungstate exhibits negative relative expansion at all temperatures tested (25° C.–800° C.). This also is true of a solid solution comprising zirconium and hafnium tungstate, as illustrated by FIG. 5.

Because the zirconium and hafnium tungstates, and solid solutions thereof, exhibit negative thermal expansion, these compounds can be used to form compositions useful for reducing the positive thermal expansion associated with most materials. For instance, the present materials might be used to prepare an epoxy.

EXAMPLE 8

An epoxy, such as Ablebond 69-5, sold by Ablestick Laboratories, Gardenia, Calif., or EPO-TEK H61, sold by Epoxy Technology, Incorporated, Billerica, Mass., is first obtained. To this epoxy is added a sufficient amount of either a zirconium or hafnium tungstate so that the resulting composition has a slightly positive, a substantially zero or a negative thermal expansion. More specifically, from about ten volume percent to about ninety-five volume percent of the zirconium or hafnium tungstate is added to the epoxy to form an epoxy composition within the scope of the present invention.

The present invention has been described with reference to preferred embodiments. Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A method for making tungstate compounds according to the formula $XW_2O_8$, wherein X is a metal selected from the group consisting of zirconium, hafnium, and combinations thereof, the method comprising:

forming a solution comprising a first compound which includes a metal ion selected from the group consisting of $Zr^{4+}$, $Hf^{4+}$ and combinations thereof, and a second compound which includes removing solvent from the solution to leave a solid product; and heating the solid product to a temperature sufficient to form said tungstate compounds.

2. The method according to claim 1 wherein the step of heating comprises heating the solid product to a temperature of greater than about 600° C.

3. The method according to claim 2 wherein the step of heating comprises heating the solid product to a temperature of at least about 1165° C.

4. The method according to claim 1 wherein the step of heating comprises heating the solid product to a temperature of from about 600° C. to about 1250° C.

5. The method according to claim 4 wherein the step of heating comprises heating the solid product to a temperature of from about 1165° C. to about 1200° C., and wherein the tungstate compounds are a single phase upon completion of the method steps.

6. The method according to claim 1 wherein the step of heating comprises:

heating the solid product to a temperature of greater than about 600° C.;

cooling the solid product;

communicating the solid product to produce a comminuted product; and heating the comminuted product to a temperature of at least about 600° C.

7. The method according to claim 6 wherein the solid product and the comminuted product are heated for less than about 4 hours.

8. The method according to claim 1 wherein the solution is an aqueous solution.

9. The method according to claim 1 wherein the first compound is selected from the group consisting of zirconium oxyhalides, zirconium oxynitrates, hafnium oxyhalides, hafnium oxynitrates and combinations thereof.

10. The method according to claim 1 wherein the first compound is selected from the group consisting of $ZrOCl_2$, $ZrOBr_2$, $ZrOI_2$, $HfOCl_2$, $HfOBr_2$, $HfOI_2$, and combinations thereof.

11. The method according to claim 1 wherein the first compound is selected from the group consisting of $ZrO(NO_3)_2$, $HfO(NO_3)_2$ and combinations thereof.

12. The method according to claim 1 wherein the second compound is $H_2WO_4$.

13. A method for preparing tungstate compounds, the method comprising:

forming an aqueous composition comprising a $W^{6+}$ compound and a second compound that is selected from the group consisting of $Zr^{4+}$ compounds, $Hf^{4+}$ compounds, and combinations thereof;

dehydrating the aqueous mixture to form a solid product; and heating the solid product to a temperature sufficient to form a compound according to the formula $XW_2O_8$, wherein X is selected from the group consisting of Zr, Hf and combinations thereof.

14. The method according to claim 13 wherein the step of forming an aqueous composition comprises combining a first aqueous $W^{6+}$ composition with a second aqueous composition comprising a compound selected from the group consisting of a $Zr^{4+}$ compound, a $Hf^{4+}$ compound, and combinations thereof.

15. The method according to claim 13 wherein the aqueous composition has a relative molar stoichiometry of $W^{6+}$ to the second compound of about 2:1.

16. The method according to claim 13 and including the step of comminuting the solid product prior to heating it.

17. The method according to claim 13 wherein the step of heating the solid product comprises:

heating the solid product to a temperature greater than about 600° C. for less than about four hours;

cooling the solid product;

comminuting the solid product to produce a comminuted product; and heating the comminuted product to a temperature of greater than about 600° C. for less than about four hours.

18. The method according to claim 17 wherein the steps of heating the solid product and the comminuted product comprise heating to a temperature of from about 600° C. to about 1250° C.

19. The method according to claim 18 wherein the steps of heating the solid product and the comminuted product comprise heating to a temperature of at least about 1165° C.

20. The method according to claim 15 wherein the steps of heating the solid product and the comminuted product comprise heating to a temperature of from about 1165° C. to about 1250° C., and wherein the tungstate compounds are a single phase upon completion of the method steps.

21. A method for making single phase compounds according to the formula $XW_2O_8$, wherein X is selected from the group consisting of $Zr^{4+}$, $Hf^{4+}$ and combinations thereof, the method comprising:

forming an aqueous composition comprising $H_2WO_4$ and a second compound selected from the group consisting of $ZrOCl_2$, $ZrOBr_2$, $ZrOI_2$, $HfOCl_2$, $HfOBr_2$, $HfOI_2$, $ZrO(NO_3)_2$, $HfO(NO_3)_2$ and combinations thereof wherein the aqueous composition has a relative molar stoichiometry of $W^{6+}$ to $Zr^{4+}$, $Hf^{4+}$ or the combination thereof, of about 2:1;

dehydrating the aqueous composition, thereby forming a solid product;

comminuting the solid product to form a comminuted product;

heating the comminuted product to a temperature of at least about 1165° C.; and rapidly cooling the solid product to room temperature.

22. The method according to claim 21 wherein the step of forming an aqueous composition comprises:

forming a first aqueous composition comprising a compound selected from the group consisting of $ZrOCl_2$, $ZrOBr_2$, $ZrOI_2$, $HfOCl_2$, $HfOBr_2$, $HfOI_2$, $ZrO(NO_3)_2$, $HfO(NO_3)_2$ and combinations thereof;

forming a second aqueous composition comprising $H_2WO_4$; and combining the first and second aqueous compositions.

23. The method according to claim 21 wherein the heating step comprises heating for less than about 4 hours.

* * * * *

UNITED STATES PATENT AND TRADEMARK OFFICE
CERTIFICATE OF CORRECTION

PATENT NO. : 5,514,360

DATED : May 7, 1996

INVENTOR(S) : Arthur W. Sleight, Mary A. Thundathil and John S.O. Evans

It is certified that error appears in the above-identified patent and that said Letters Patent is hereby corrected as shown below:

Column 5, line 49, "HrO(NO$_3$)$_2$" should be --HfO(NO$_3$)$_2$--;

Column 9, line 4 (claim 1), "which includes" should be followed with --W$^{6+}$--; and Column 9, line 29 (claim 6), "communicating" should be --comminuting--.

Signed and Sealed this

Fourth Day of February, 1997

Attest:

BRUCE LEHMAN

Attesting Officer

Commissioner of Patents and Trademarks